United States Patent
Wehrmann (10) Patent No.: US 11,460,135 B2
(45) Date of Patent: Oct. 4, 2022

(54) COUPLING ELEMENT FOR CONNECTING A FIRST FLUID-CONDUCTING LINE TO A SECOND FLUID-CONDUCTING LINE, AND COUPLING ASSEMBLY

(71) Applicant: AFT AUTOMOTIVE GMBH, Greven-Reckenfeld (DE)

(72) Inventor: Christoph Wehrmann, Wettringen (DE)

(73) Assignee: AFT AUTOMOTIVE GMBH, Greven-Reckenfeld (DE)

( * ) Notice: Subject to any disclaimer, the term of this patent is extended or adjusted under 35 U.S.C. 154(b) by 228 days.

(21) Appl. No.: 16/613,594

(22) PCT Filed: Apr. 25, 2018

(86) PCT No.: PCT/EP2018/060631
§ 371 (c)(1),
(2) Date: Nov. 14, 2019

(87) PCT Pub. No.: WO2018/215155
PCT Pub. Date: Nov. 29, 2018

(65) Prior Publication Data
US 2020/0149670 A1    May 14, 2020

(30) Foreign Application Priority Data

May 22, 2017    (DE) ................. 10 2017 208 643.2

(51) Int. Cl.
*F16L 37/098*    (2006.01)
*F16L 37/14*    (2006.01)
*F16L 37/088*    (2006.01)

(52) U.S. Cl.
CPC ......... *F16L 37/0985* (2013.01); *F16L 37/144* (2013.01); *F16L 37/0885* (2019.08);
(Continued)

(58) Field of Classification Search
CPC ... F16L 37/084; F16L 37/0847; F16L 37/098; F16L 37/0985; F16L 37/12; F16L 37/133; F16L 2201/10; F16L 2201/20
(Continued)

(56) References Cited

U.S. PATENT DOCUMENTS

| 4,844,512 A | 6/1989 | Gahwiler |
| 4,902,045 A | 2/1990 | McGugan et al. |

(Continued)

FOREIGN PATENT DOCUMENTS

| CN | 1242064 A | 1/2000 |
| CN | 1301333 A | 6/2001 |

(Continued)

OTHER PUBLICATIONS

International Search Report from Corresponding International Application No. PCT/EP2018/060631 dated Aug. 24, 2018.
(Continued)

*Primary Examiner* — Aaron M Dunwoody
(74) *Attorney, Agent, or Firm* — Pearne & Gordon LLP (57) ABSTRACT

The application relates to a coupling element for connecting a first fluid-conducting line to a second fluid-conducting line. Here it is provided that an indicator device is mounted on a latching device and has a retaining element which can be elastically deflected in the radial direction relative to a guide element of the indicator device and which in a latched position engages in the latch receiving area and secures the indicator device in the axial direction by interacting with a main part and in a non-latched position lies outside the latch receiving area and releases the indicator device to move in the axial direction. The invention additionally relates to a coupling assembly.

13 Claims, 4 Drawing Sheets

(52) U.S. Cl.
CPC ....... *F16L 37/0982* (2013.01); *F16L 2201/10* (2013.01); *F16L 2201/20* (2013.01)

(58) Field of Classification Search
USPC .................................................. 285/93, 307
See application file for complete search history.

(56) References Cited

U.S. PATENT DOCUMENTS

| | | | |
|---|---|---|---|
| 4,946,205 | A | 8/1990 | Washizu |
| 5,924,746 | A | 7/1999 | Fixemer |
| 6,328,349 | B2 | 12/2001 | Bandlow et al. |
| 6,536,807 | B1 | 3/2003 | Raymond et al. |
| 9,283,344 | B2 | 3/2016 | Sheffer et al. |
| 2001/0040377 | A1 | 11/2001 | Bandlow et al. |
| 2007/0222216 | A1 | 9/2007 | Bauer |
| 2012/0119485 | A1 | 5/2012 | Cichorek et al. |
| 2013/0167841 | A1 | 7/2013 | Sheffer et al. |
| 2014/0197629 | A1* | 7/2014 | Barthel ............... F16L 37/0985 285/93 |
| 2016/0193440 | A1 | 7/2016 | Sheffer et al. |

FOREIGN PATENT DOCUMENTS

| | | |
|---|---|---|
| CN | 103182127 A | 7/2013 |
| DE | 3727858 A1 | 1/1989 |
| DE | 198 22 574 C1 | 10/1999 |
| DE | 10 2006 013 899 B3 | 11/2006 |
| DE | 10 2009 033 943 A1 | 1/2011 |
| EP | 0806597 A1 | 11/1997 |
| EP | 0924453 A1 | 6/1999 |
| EP | 1 380 791 A | 1/2004 |
| GB | 2 199 102 A | 6/1988 |
| KR | 2001-0034691 A | 4/2001 |
| WO | 98/22743 A1 | 5/1998 |

OTHER PUBLICATIONS

Written Opinion from Corresponding International Application No. PCT/EP2018/060631 dated Aug. 24, 2018.

English translation of Written Opinion for corresponding International Application No. PCT/EP2018/060631 dated Aug. 24, 2018.

International Preliminary Report on Patentability for corresponding International Application No. PCT/EP2018/060631 dated Nov. 26, 2019.

Chinese Office Action dated Nov. 2, 2020 for corresponding Chinese Application No. 2018800340866 and English translation.

* cited by examiner

COUPLING ELEMENT FOR CONNECTING A FIRST FLUID-CONDUCTING LINE TO A SECOND FLUID-CONDUCTING LINE, AND COUPLING ASSEMBLY

FIELD OF THE INVENTION

The invention relates to a coupling element for connecting a first-fluid-conducting line to a second fluid-conducting line, wherein the coupling element can be connected to the first line and is designed to receive a coupling counter-element which can be connected to the second line and which comprises an at least partially circumferential latching collar, wherein the coupling element has a latching device which comprises a main part and an elastically deformable ring, arranged on the main part, with at least one latching projection which protrudes inward in the radial direction, wherein, viewed in the axial direction, between an end abutment surface of the main part and a latching surface of the latching projection, a latch receiving area for receiving the latching collar lies, and wherein the ring and the latching projection are formed in such a manner that, when the coupling element and the coupling counter-element are connected, the latching projection is elastically deflected outward in the radial direction by the latching collar, and, after the arrangement of the latching collar in the latch receiving area, the latching projection assumes a latched position in which it pushes the latching collar from behind in a latching manner in order to retain the coupling counter-element relative to the coupling element. The invention additionally relates to a coupling assembly.

The coupling element is a component of the coupling assembly, by means of which two fluid-conducting lines, that is to say the first fluid-conducting line and the second fluid-conducting line, can be connected preferably in a fluid-tight manner to one another. In principle, the fluid-conducting lines can here be of any design. For example, one or more fluid-conducting lines are in the form of a pipeline. A design of one or more of the fluid-conducting lines in the form of a hose line can also be provided. In comparison to the hose line, the pipeline is characterized by its rigid design, whereas the hose line is flexible.

For establishing the fluid-tight connection between the first fluid-conducting line and the second fluid-conducting line, the coupling assembly comprises the coupling element and the coupling counter-element. The coupling element is associated, for example, with the first fluid-conducting line and can be connected to it or is already connected to it. Conversely, the coupling counter-element line is associated with the second fluid-conducting line and can be connected to it or is already connected to it.

Preferably, the coupling element is used exclusively for retaining the two fluid-conducting lines against one another. The fluid-tight connection between the two fluid-conducting lines, on the other hand, is preferably implemented by engaging the fluid-conducting lines in one another. Thus, for example, the first fluid-conducting line is inserted into the second fluid-conducting line or vice versa, namely in such a manner that the two fluid-conducting lines are connected in a fluid-tight manner to one another. For example, for this purpose, on one of the fluid-conducting lines, a gasket is arranged, which, after one of the fluid-conducting lines has been introduced into the respective other one of fluid-conducting lines, is in sealing contact with the two fluid-conducting lines.

The coupling assembly now engages both on the first fluid-conducting line and also on the second fluid-conducting line, in order to retain them against one another, that is to say in order to prevent the separation of the two fluid-conducting lines from one another. For example, for this purpose, it secures the first fluid-conducting line in or on the second fluid-conducting line, thus preventing the first fluid-conducting line from slipping out of the second fluid-conducting line.

The coupling counter-element which is associated with the second line comprises the at least partially circumferential latching collar. Particularly preferably, the latching collar is designed to be continuous in the circumferential direction relative to a longitudinal central axis of the coupling counter-element, that is to say it is continuously circumferential on the coupling counter-element. Particularly preferably, the coupling counter-element is designed as part of the second line and to that extent it is permanently connected thereto. Particularly preferably, the counter-element is designed to be made of the same material as the second line, particularly if the second line is in the form of a pipeline.

The coupling element is designed for the at least partial receiving of the coupling counter-element. To that extent, for the fluid-tight connection of the two fluid-conducting lines, the coupling counter-element is inserted into the coupling element. The coupling element comprises the latching device which, after the insertion of the coupling counter-element into the coupling element, is used for the latching retention of the coupling counter-element in the coupling element. The latching device comprises the main part as well as the elastically deformable ring. The main part is preferably of rigid design or it is at least more rigid than the ring. The ring is arranged on the main part, in particular fastened thereto. Particularly preferably, the ring is designed to form a single piece with and/or to be made of the same material as the main part. In this case, the more rigid design of the main part is implemented preferably by means of a material thickness which is greater in comparison to the ring.

The ring at least partially, in particular completely, encloses a longitudinal central axis of the coupling element in the circumferential direction. In the latter case, to that extent, the ring is designed to be continuous in the circumferential direction. On the ring, the at least one latching projection is arranged or formed and protrudes inward in the radial direction, that is to say, after the introduction of the coupling counter-element into the coupling element, it protrudes in the direction of the coupling counter-element starting from the ring. The latching projection is used for the latching retention of the coupling counter-element relative to the coupling element by pushing the latching collar from behind in a latching manner. After the introduction of the coupling counter-element into the coupling element, to that extent, the latching projection interacts with the latching collar in order to retain the coupling counter-element in the coupling element.

The coupling element comprises the latch receiving area which is designed for receiving the latching collar after the introduction of the coupling element into the coupling element. Viewed in the axial direction relative to the longitudinal central axis of the coupling element, the latch receiving area is delimited, on the one hand, by the end abutment surface of the main part and, on the other hand, by the latching surface of the latching projection. After the introduction of the coupling counter-element into the coupling element, to that extent, viewed in the longitudinal section relative to the longitudinal central axis, the latching collar lies between the end abutment surface and the latching surface.

Here, it can be provided that the latch receiving area has larger dimensions in the axial direction than the latching collar, in order to ensure an easy introduction of the latching collar into the latch receiving area and a reliable latching by means of the latching projection. In such a design, to that extent, the coupling element retains the coupling counter-element with play in the axial direction, wherein, however, by means of the latching projection, the latching collar is prevented in each case from accidentally coming out of the latch receiving area.

The ring and the latching projection are formed in such a manner that, during the introduction of the coupling counter-element into the coupling element, the latching projection is first elastically deflected outward in the radial direction by the latching collar, wherein the ring is elastically deformed. After the arrangement of the latching collar in the latch receiving area, the latching projection assumes its latched position into which it is pushed by the ring or by a resetting force of the ring. In the latched position, it pushes the latching collar from behind in order to retain the coupling counter-element relative to the coupling element, wherein the retention—as already indicated—can occur with play or without play. In each case, the latching projection prevents the latching collar from accidentally coming out of the latch receiving area.

A release of the connection between the two fluid-conducting lines or between the coupling element and the coupling counter-element is enabled by a manual pushing against the elastically deformable ring. For this purpose, actuation sites are provided on the ring, on which a user can act. The pushing occurs in such a manner that the latching projection comes out of the latch receiving area and therefore releases the latching collar to move out of the latch receiving area. For example, the actuation of the ring occurs by deforming the ring inward in the radial direction at actuation sites which are spaced from the latching projection. Here, the deforming occurs in such a manner that the latching projection is moved outward in the radial direction and, in the case of sufficient deformation of the ring, it releases the latching collar to move out of the latch receiving area.

BACKGROUND OF THE INVENTION

A coupling device or a coupling element which works according to this operating principle is known, for example, from the published document DE 37 27 858 A1. There, a quick connection for connecting a hose line or a pipeline is described, which consists of a core portion and a housing portion, which can each be firmly connected by an end to a hose, a pipe or a device. The sealing between the core portion and the housing portion occurs via annular gaskets. On the outer side of the core portion, a ring is formed, with a ramp surface directed toward the free end and with an abutment surface opposite said ramp surface. The inner diameter of the housing portion is greater than the outer diameter of the core portion and, on the free end of the inner wall of the housing portion, at least two diametrically opposite cams are formed, with ramp surfaces directed toward the free end and with abutment surfaces facing said ramp surfaces. The clear spacing between the cams is approximately as large as the outer diameter of the core portion, and the housing portion consists of an elastic material. In the context of this description, reference is made to the entire disclosure of this published document.

BRIEF SUMMARY OF THE INVENTION

The aim of the invention is to propose a coupling element which has advantages in comparison to known coupling elements, in particular which enables the easy and reliable production of a fluid-tight connection between the two fluid-conducting lines.

According to the invention, this is achieved with a coupling element. Here, it is provided that an indicator device is mounted on the latching device and comprises a retaining element which can be elastically deflected in the radial direction relative to a guide element of the indicator device, which in a latched position engages in the latch receiving area and secures the indicator device in the axial direction by interaction with the main part and in a non-latched position lies outside the latch receiving area and releases the indicator device to move in the axial direction.

To that extent, the indicator device is in principle arranged movably on the latching device, namely so that it can be moved in the axial direction. For this purpose, it is mounted correspondingly on the latching device; for example, the latching device has a guide device for the linear guiding of the indicator device. The indicator device comprises the guide element and the retaining element. Preferably, the guide element and the retaining element are designed to form a single piece and/or to be of the same material as one another. For example, the guide element and the retaining element together are in the form of an injection molded part. Preferably, the guide element is of more rigid design than the elastically deflectable retaining element. Again, this can be implemented by a greater material thickness of the guide element in comparison to the retaining element.

Due to the elastic deflection in the radial direction, the retaining element can be arranged in different positions, namely at least in the latched position and the non-latched position. In the latched position, the retaining element engages in the latch receiving area and therefore secures the entire indicator device in the axial direction by interaction with the main part and/or the latching projection. In the latched position, the retaining element protrudes in the radial direction inward starting from the guide element and to that extent engages in the radial direction from the outside in the latch receiving area. Preferably, in its latched position, the retaining element interacts exclusively with the main part to secure the indicator device. On the other hand, if the retaining element is moved into the non-latched position, namely by elastic deflection, then the indicator device is released to move in the axial direction. This means that, in the non-latched position, the retaining element is released from engagement with the main part and correspondingly enables the movement of the indicator device.

The latch receiving area is basically understood to mean the entire area which, viewed in the axial direction or in the longitudinal section, runs all around in the circumferential direction between the end abutment surface and the latching surface. To that extent, the latch receiving area is formed continuously in the circumferential direction and completely surrounds the longitudinal central axis of the coupling element. In the circumferential direction, it is not limited to the areas in which the latching projection lies or the latching projections lie.

The movement of the retaining element occurs by the coupling counter-element, namely in particular its latching collar. When the coupling counter-element is introduced into the coupling element, the latching collar enters the latch receiving area and, in the process, it pushes the retaining element outward in the radial direction, namely out of the latch receiving area. Viewed in the circumferential direction, the retaining element engages in the latch receiving area in the latched position adjacently to the latching projection. It can be provided that, viewed in the axial direction, the retaining element in its latched position interacts on both sides with the main part, in order to secure the indicator device relative to the latching device, in particular in that it is in contact, on the one hand, with the end abutment surface of the main part.

Such a design of the coupling element enables an easy and reliable inspection of the latching connection between the coupling element and the coupling counter-element. It is only after the coupling counter-element has been introduced into the coupling element so that the latching collar pushes the retaining element out of the latch receiving area that the indicator device can be moved in the axial direction relative to the latching device. During the mounting, the coupling counter-element is then first introduced into the coupling element and subsequently the indicator device is moved relative to the latching device, namely preferably in the axial direction in the direction of the ring.

Preferably, the indicator device can be moved in the axial direction until the retaining element which is elastically deflected by the latching collar is arranged relative to the latching collar in such a manner that it pushes said latching collar from behind and additionally retains it in a latching manner. Correspondingly, after the latching of the retaining element with the latching collar, a return movement of the indicator device is no longer possible. Instead, said indicator device is then again secured relative to the latching device. Correspondingly, the user performing the mounting can determine directly from the axial arrangement of the indicator device whether the connection between the coupling counter-element and the coupling element has been established completely or according to specification. Preferably, in order to achieve a clear indicating effect of the indicator device, the indicator device is at least partially and in particular completely of a different color than the latching device.

An additional design of the invention provides that, in the latched position of the retaining element, a movement of the indicator device in the axial direction is limited, on the one hand, by the end abutment surface and, on the other hand, by an offset formed on the main part. The offset is present on the main part and preferably protrudes outward in the radial direction. By means of the offset, a step is formed on the main part, which limits the movement of the indicator device in the axial direction, provided that the retaining element is in its latched position. While the offset limits the movement of the indicator device in a first axial direction, the end abutment surface limits the movement in a second axial direction opposite the first axial direction. It can be provided that, in the latched position, the indicator device is in contact, on the one hand, with the end abutment surface and, on the other hand, with the offset, wherein this is preferably the case for the retaining element of the indicator device. In such a design of the coupling element, the indicator device is completely secured in the axial direction when in the latched position, so that an erroneous operation is reliably prevented.

An additional preferred embodiment of the invention provides that the retaining element is designed so that, when the latching collar is introduced into the latch receiving area, it is pushed outward in the radial direction out of the latch receiving area and moved into the non-latched position. For this purpose, the retaining element preferably has a sloping surface directed inward in the radial direction, with which the latching collar interacts when it is introduced into the latch receiving area, in order to elastically push the retaining element outward in the radial direction.

A development of the invention provides that, when the retaining element is arranged in the non-latched position, the indicator device is not engaged with the offset, so that a movement of the guide element in the direction of the ring is released. Preferably, due to the movement of the guide element, the area of the indicator device which was previously engaged with the offset, as well as preferably the guide element, is raised in the radial direction beyond the offset, so that the mentioned area subsequently lies further outward in the radial direction than the offset. In the subsequent movement of the indicator device in the axial direction, it or the retaining element overruns the offset.

An additional embodiment of the invention provides that the retaining element has at least two retaining arms which, viewed in the circumferential direction, are arranged on both sides of the latching projection. This does not necessarily mean that the retaining arms overlap in the axial direction with the retaining element. Instead, viewed in the axial direction or in the longitudinal section relative to the longitudinal central axis of the coupling element, they can certainly be arranged adjacent to the retaining element. The retaining arms are arranged spaced apart in the circumferential direction and extend in the axial direction starting from the guide element. It can be provided that, in at least one axial position of the indicator device, the two retaining arms each are in contact with the latching projection. For example, here, one of the retaining arms is in contact on one hand with the latching projection and another of the retaining arms is in contact on the other hand with the latching projection. Thereby, a guiding of the retaining element or of the indicator device in the circumferential direction is brought about. To that extent, no turning of the indicator device with respect to the latching device is possible.

A preferred additional embodiment of the invention provides that the at least two retaining arms each start from the guide element and are connected to one another by means of a transverse web spaced from the guide element. To that extent, the retaining arms are connected to one another both via the guide element and also via the transverse web. Starting from one of the retaining arms, the transverse web extends all the way to the other one of the retaining arms. The transverse web is used, on the one hand, to stabilize the two retaining arms and, on the other hand, to secure the indicator device in the axial direction, provided that the retaining element is in its latched position. Preferably, the transverse web is formed in the radial direction on the outside on the retaining arms. The transverse web is implemented particularly preferably so as to form a single piece with and/or to be made of the same material as the two retaining arms.

A development of the invention provides that, in the latched position, the transverse web interacts with the offset to limit the movement of the indicator device in the axial direction. Thus, if the retaining element is in the latched position, then the transverse web acts on the offset. Preferably, a planar surface of the transverse web is in contact with a likewise planar surface of the offset, wherein each of the two planes lies in a respective imaginary plane which is perpendicular to the longitudinal central axis of the coupling element. With such an orientation of the surfaces, a reliable securing of the indicator device in the axial direction when in the latched position is brought about and, on the other hand, an easy disengagement is possible when the retaining element is moved into the non-latched position.

An additional advantageous embodiment of the invention provides that, when the retaining element is in the non-latched position, the indicator device is released to move between a first position and a second position, wherein, in the first position, viewed in the axial direction, a retaining projection of the retaining element overlaps with the latch receiving area, and, in the second position, the indicator device, in particular the transverse web, interacts with the ring to prevent a movement beyond the second position. The first position occurs after the retaining element has been pushed out of the latch receiving area by the latching collar, that is to say before the indicator device has been moved in the axial direction. Correspondingly, viewed in the axial direction or in the longitudinal section, the retaining element or at least its retaining projection overlaps with the latch receiving area.

In the non-latched position of the retaining element, the indicator device can be moved out of the first position in the direction of the second position or into said second position. In the second position, the axial movement of the indicator device is limited by the interaction of the indicator device with the ring. In other words, in the second position, the indicator device, preferably the transverse web, is in contact with the ring in such a manner that the indicator device arriving from the first position cannot be moved beyond the second position.

Preferably, it can be provided that, in the second position, the retaining element is latched to the latching collar, that is to say it pushes said latching collar from behind, in such a manner that the latching collar is retained in a latching manner not only by means of the latching device, that is to say the latching projection, but additionally by means of the retaining element. Since the latching collar is pushed from behind by the retaining element, the indicator device is secured in the second position, that is to say it can no longer be moved directly out of said second position, in particular in the direction of the first position or into said first position. By means of such a design, an additional stiffening of the coupling element or of the coupling assembly is achieved. In addition, when the retaining element is latched to the latching collar, a sound is generated, which is used as acoustic feedback. As soon as the sound occurs, to that extent, it can be assumed that the latching connection of the two fluid-conducting lines or of the coupling element to the coupling counter-element has been established according to specification.

Finally, in the context of an additional preferred embodiment of the invention, it can be provided that the main part comprises a guide device for the linear guiding of the indicator device, wherein, viewed in the axial direction, the guide device overlaps with the ring, and, in the second position, the indicator device is between the main part and the ring, so that, in the case of an elastic deformation in the radial direction inward the ring is supported via the indicator device on the base body for the limitation of the deformation.

The guide device is used for guiding the indicator device in the axial direction, that is to say in particular between the first position and the second position. The guide device is formed on the main part of the latching device and it is preferably rigid, in particular in the radial direction. The guide device extends in the radial direction up to the ring, so that it overlaps with the ring. Particularly preferably, it extends partially through the ring in the axial direction at least in some areas. Here, it is arranged spaced in the radial direction from the ring, so that, when the indicator device is arranged in the first position, the elastic deformation of the ring is directly possible.

However, in the second position, the indicator device should be arranged between the main part and the ring. If a force is then exerted on the ring in the radial direction inward, then the ring is supported via the indicator device on the guide device and therefore on the main part, so that the deformation of the ring in the radial direction is limited. Preferably, when the ring is not deformed, the indicator device is in contact in the radial direction inward with the guide device and in the radial direction outward with the ring, so that not even a slight deformation of the ring is allowed.

The invention moreover relates to a coupling assembly for connecting a first fluid-conducting line to a second fluid-conducting line, with a coupling element, in particular with a coupling element according to the preceding designs, which can be connected to the first line and which is designed to receive a coupling counter-element which can be connected to the second line and which comprises an at least partially circumferential latching collar, wherein the coupling element has a latching device which has a main part and an elastically deformable ring, arranged on the main part, with at least one latching projection protruding inward in the radial direction, wherein, viewed in the axial direction, a latch receiving area for receiving the latching collar lies between an end abutment surface of the base body and a latching surface of the latching projection, and wherein the ring and the latching projection are formed in such a manner that, when the coupling element and the coupling counter-element are connected by the latching collar, the latching projection is elastically deflected outward in the radial direction by the latching collar, and, after the arrangement of latching collar in the latch receiving area, the latching projection assumes a latched position in which it pushes the latching collar from behind in a latching manner in order to retain the coupling counter-element relative to the coupling element.

Here, it is provided that an indicator device is mounted on the latching device and comprises a retaining element which can be elastically deflected in the radial direction relative to a guide element of the indicator device, which in a latched position engages in the latch receiving area and secures the indicator device in the axial direction by interacting with the main part, and in a non-latched position is outside the latch receiving area and releases the indicator device to move in the axial direction.

Reference has already been made to the advantages of such a design of the coupling assembly or of the coupling element. Both the coupling assembly and also the coupling element can be further developed according to the above designs, so that, to that extent, reference is made to them.

BRIEF DESCRIPTION OF THE DRAWINGS

The invention is explained in further detail below in reference to the embodiment examples represented in the drawing, without a limitation of the invention occurring. In the drawing.

DESCRIPTION OF EXAMPLE EMBODIMENTS

Figure 1:
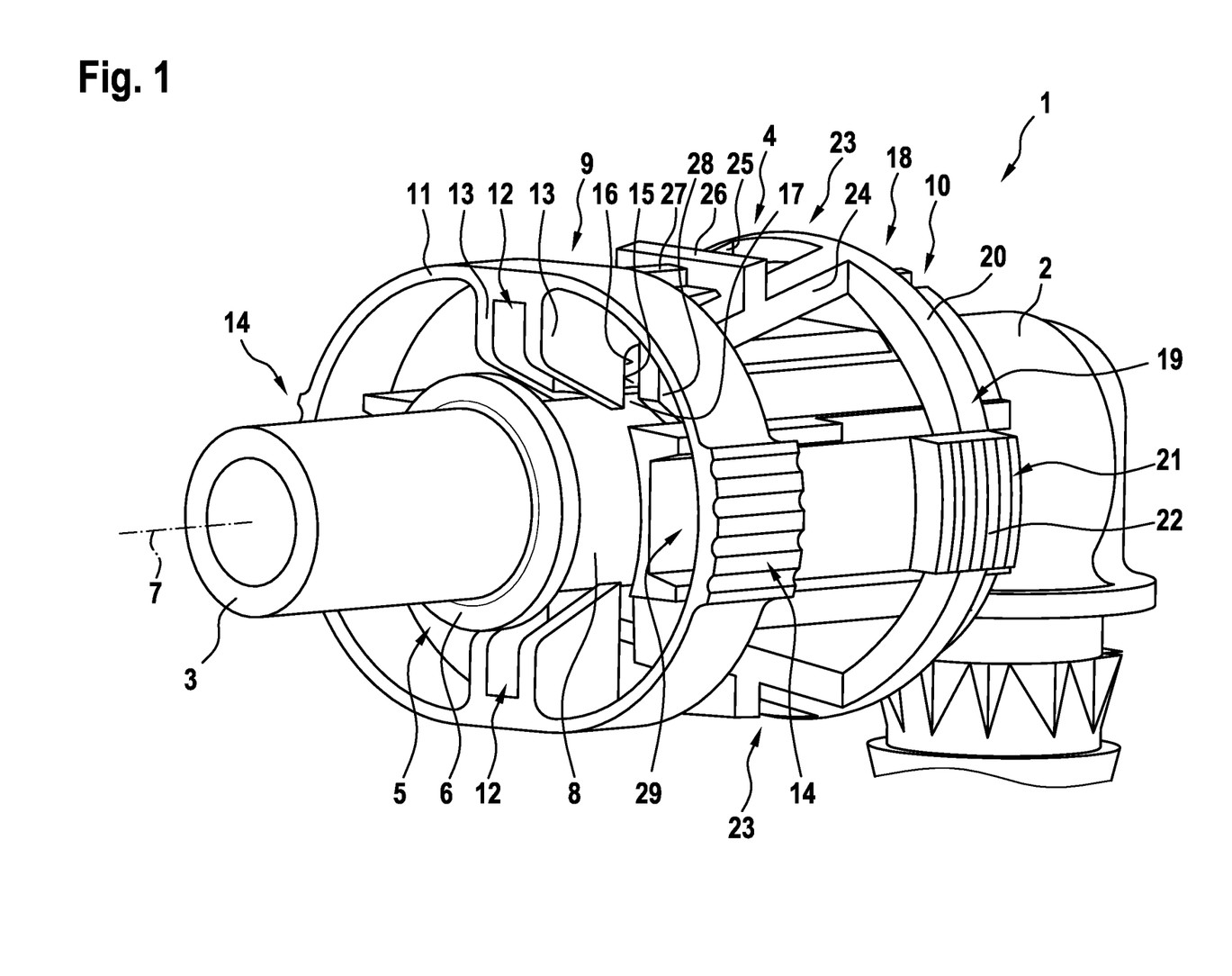
FIG. 1 shows a coupling assembly for connecting fluid-conducting lines, with a coupling element and a coupling counter-element.

FIG. 1 is a diagrammatic representation of a coupling assembly 1 which is used for connecting a first fluid-conducting line 2 to a second fluid-conducting line 3. For this purpose, on the first fluid-conducting line 2, a coupling element 4 is arranged and fastened, while, on the second fluid-conducting line 3, a coupling counter-element 5 is present, which, in the embodiment example represented here, is designed to form a single piece with the second fluid-conducting line 3. The coupling counter-element 5 has a latching collar 6 which is designed as a radial projection which runs at least partially all around in the circumferential direction relative to a longitudinal central axis 7. The coupling counter-element 5 moreover has a plug projection 8 which is formed for the introduction into the coupling element 4 as well as the first fluid-conducting line 2.

The coupling element 4 comprises a latching device 9 which in turn has a main part 10 as well as an elastically deformable ring 11. The ring 11 is preferably designed to be continuous in the circumferential direction relative to the longitudinal central axis 7; to that extent, it completely surrounds the longitudinal central axis 7 in the circumferential direction. On the ring, at least one latching projection 12 which protrudes inward in the radial direction is designed, which, in the embodiment example represented here, consists of two latching webs 13 spaced apart from one another in the circumferential direction. Moreover, in the embodiment example represented here, two such latching projections 12 are formed, namely diametrically opposite one another relative to the longitudinal central axis 7.

Spaced apart from the latching projections 12 in the circumferential direction, on the ring 11, two respective actuation sites 14 are formed, which the user of the coupling assembly 1 or the coupling element 4 can push to elastically deform the ring 11. Preferably, viewed in the circumferential direction, the respective actuation sites 14 are arranged centrally between the two latching projections 12, but in contrast to the latching projections they are arranged on the outside on the ring 11, viewed in the radial direction.

On the latching projection 12, on its side facing the main part 10, a latching surface 15 is formed, which is preferably planar and lies entirely in an imaginary plane which is perpendicular to the longitudinal central axis 7 or forms an angle relative to it such that the latching surface 15 runs in the radial direction inward in the axial direction into the main part 10. When viewed in the longitudinal section relative to the longitudinal central axis 7, the latching surface 15, together with an end abutment surface 16 of the main part 10, delimits a latch receiving area 17 for receiving the latching collar 6. The latch receiving area 17 is designed to be continuous in the circumferential direction, that is to say, in particular, it is not limited in the circumferential direction to the areas overlapping with the latching surface 15.

The ring 11 and the latching projection 12 are then formed in such a manner that, when the coupling element 4 is connected to the coupling counter-element 5, that is to say when the coupling counter-element 5 is introduced into the coupling element 4, the latching projection 12 is elastically deflected outward in the radial direction by the latching collar 6. After the arrangement of the latching collar 6 in the latch receiving area 17, the latching projection 12 springs back inward and assumes a latched position in which it pushes the latching collar 6 from behind in a latching manner. Due to this pushing from behind, the coupling counter-element 5 is limited in its movement relative to the coupling element 4 in the radial direction, so that the coupling counter-element 5 cannot come out of the coupling element 4.

In addition to the latching device 9, the coupling element 4 comprises an indicator device 18. Said indicator device is used for the easy inspection of a fastening of the coupling counter-element 5 on the coupling element 4 according to specification. The indicator device 18 is mounted so that it can be moved in the axial direction on the latching device 9. It has a guide element 19 which, in the embodiment example represented here, has a guide ring 20 and a guide projection 21. On the guide ring 20 and/or the guide projection 21, an actuation area 22 is formed, which a user of the coupling element 4 can push to move the indicator device 18 in the axial direction.

In addition to the guide element 19, the indicator device 18 comprises a retaining element 23. Said retaining element in turn consists of two retaining arms 24 and 25 which are connected to one another via a transverse web 26 spaced from the guide element 19. The retaining arms 24 and 25 each start from the guide element 19, in particular from the guide ring 20. The transverse web 26 is formed spaced in the axial direction from the guide element 19, namely its guide ring 20. Preferably, the transverse web 26 is on a radially external outer side of the retaining arms 24 and 25.

In the embodiment example represented here, on the guide element 19, multiple retaining elements 23, namely precisely two retaining elements 23, are formed. They are diametrically opposite one another relative to the longitudinal central axis 7. The two retaining elements 23 are of identical design, so that only one of the retaining elements 23 is discussed below. All the designs also apply to the respective other one of the retaining elements 23. Naturally, in principle, any number of retaining elements 23 can be present, that is to say also precisely exactly one retaining element 23 only or else—as represented here—multiple retaining elements 23.

In the representation shown, the indicator device 18 is in a first position. In said position, the transverse web 26 is in contact with an offset 27 which is formed on the main part 10 and which extends outward in the radial direction. The retaining element 23 has a retaining projection 28, wherein said retaining projection is formed on the retaining arm 24 and 25. In particular, the retaining projection 28 protrudes inward in the radial direction. It can be provided that on each of the retaining arms 24 and 25 a respective separate retaining projection 28 is formed.

In addition, it can be seen that the main part 10 has a guide device 29 which is used for the linear guiding of the indicator device 18. Preferably, the guide device 29 is in the form of a guide channel in which the guide projection 21 of the guide element 19 engages.

The retaining element 23, in particular the retaining arms 24 and 25, can be elastically deflected in the radial direction. In a latched position, it engages in the latch receiving area 17, so that the indicator device 18 is secured in the axial direction by interacting with the main body 10. The interaction occurs, on the one hand, via the contact of the retaining element 23 on the end abutment surface 16 of the main part 10 and in the opposite axial direction via contact of the transverse web 26 with the offset 27. On the other hand, if the retaining element 23 is moved or respectively the retaining arms 24 and 25 are moved into a non-latched position, then the indicator device 18 is released to move in the axial direction. This means, on the one hand, that, in the non-latched position, the retaining element 23, in particular the retaining arms 24 and 25 or their retaining projections 28, are disengaged from the end abutment surface 16 and, on the other hand, the transverse web 26 is arranged so that it does not engage with the offset 27.

The movement of the retaining element 23 in the radial direction from the latched position into the non-latched position is brought about by the introduction of the latching collar 6 into the latch receiving area 17. Above, it has already been explained that, in its latched position, the retaining element 23 is arranged in said latch receiving area. If the latching collar 6 is then moved in the axial direction into the coupling element 4 or into the latch receiving area 17, then it pushes the retaining element 23 outward in the radial direction out of the latch receiving area 17, so that the retaining element 23 is subsequently in its non-latched position.

Figure 2:
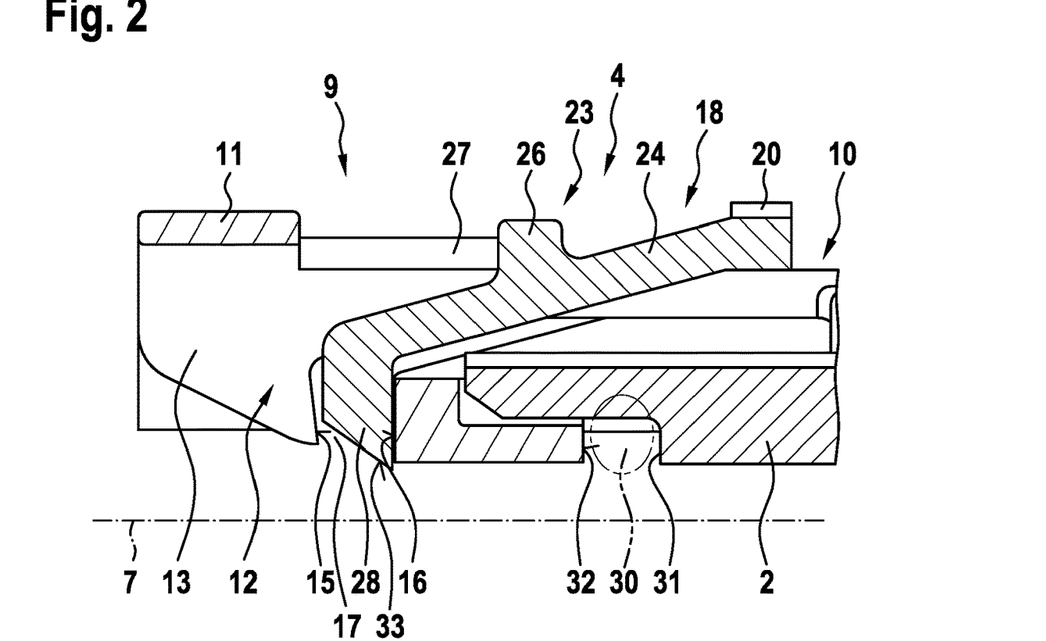
FIG. 2 shows a diagrammatic longitudinal cross-sectional representation through the coupling element and the first fluid-conducting line, wherein a retaining element of an indicator device is in a latched position.

FIG. 2 shows a diagrammatic longitudinal cross-sectional representation through a portion of a coupling assembly 1, wherein, in particular, the coupling element 4 as well as the first fluid-conducting line 2 can be seen. It is clear that the main body 10 partially engages in the first fluid-conducting line 2 and is used there to retain a gasket 30. The gasket 30 is secured in the axial direction or at least retained with play, on the one hand, by a step 31 which is formed in the first fluid-conducting line 2 and, on the other hand, by a front end 32 of the main part 10.

The retaining element 23 is represented in its latched position. Correspondingly, it engages in the latch receiving area 17. It is clear that the retaining element 23, in particular the retaining projection 28, has a sloping surface 33 with which the latching collar 6 interacts when it is introduced into the latch receiving area 17, in order to push the retaining element 23 out of the latched position in the direction of the non-latched position or into said position. Moreover, it can be seen that, in the latched position, the retaining element 23 is in contact in the axial direction, on the one hand, with the end abutment surface 16 and, on the other hand, with an offset 27, so that the indicator device 18 as a whole is secured in the axial direction.

FIG. 3 again shows a diagrammatic longitudinal cross-sectional representation of the coupling assembly 1, wherein both the coupling element 4 and also the coupling counter-element 5 are represented. The coupling counter-element 5 is moved into the coupling element 4 until the plug projection 8 engages in the first fluid-conducting line 2 and is there in sealing contact by its outer circumferential surface with the gasket 30. Correspondingly, the gasket 30 is in contact both with the first fluid-conducting line 2 and also with the second fluid-conducting line 3 or the coupling counter-element 5.

Figure 3:
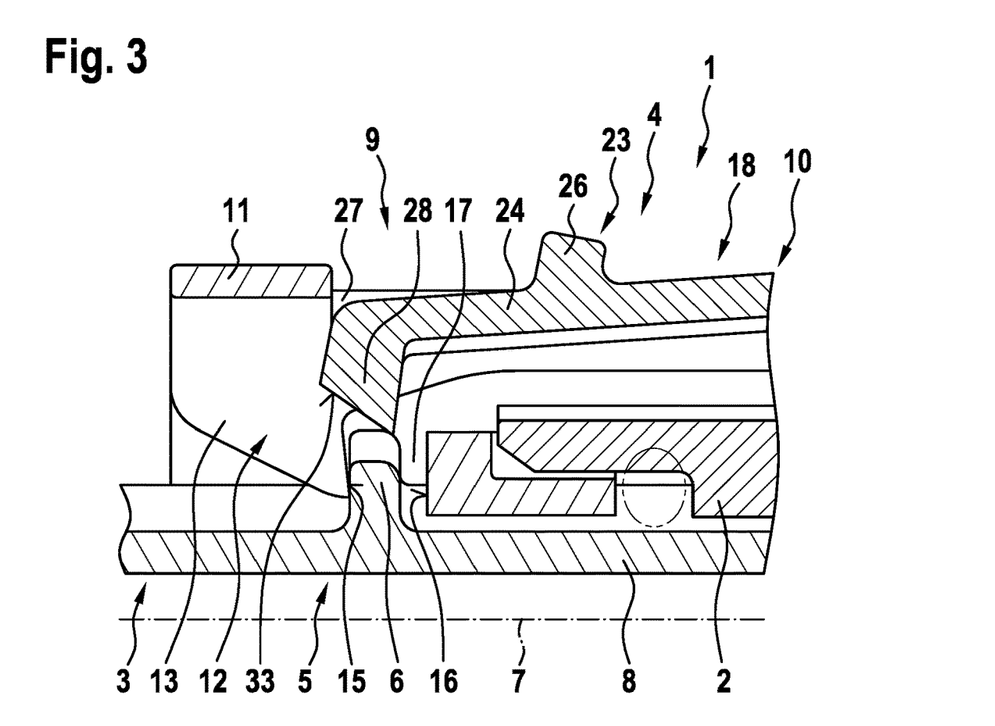
FIG. 3 shows a diagrammatic longitudinal cross-sectional representation of the coupling assembly, wherein the retaining element is arranged in a non-latched position.

In this arrangement of the coupling counter-element 5, the latching collar 6 is arranged in the latch receiving area 17. Correspondingly, the latching collar interacts with the sloping surface 33 in order to push the retaining element 23 out of the latch receiving area 17, so that the retaining element 23 is in its non-latched position. In this non-latched position, the transverse web 26 is arranged, viewed in the radial direction, is arranged beyond the offset 27 or farther outward than said offset, so that the indicator device 18 can be moved in the axial direction, namely in the direction of the ring 11. In particular, the indicator device 18 can be moved in the axial direction in such a manner that the transverse web 26 is in contact with the ring 11, so that an end abutment for the indicator device 18 in the axial direction is implemented.

Figure 4:
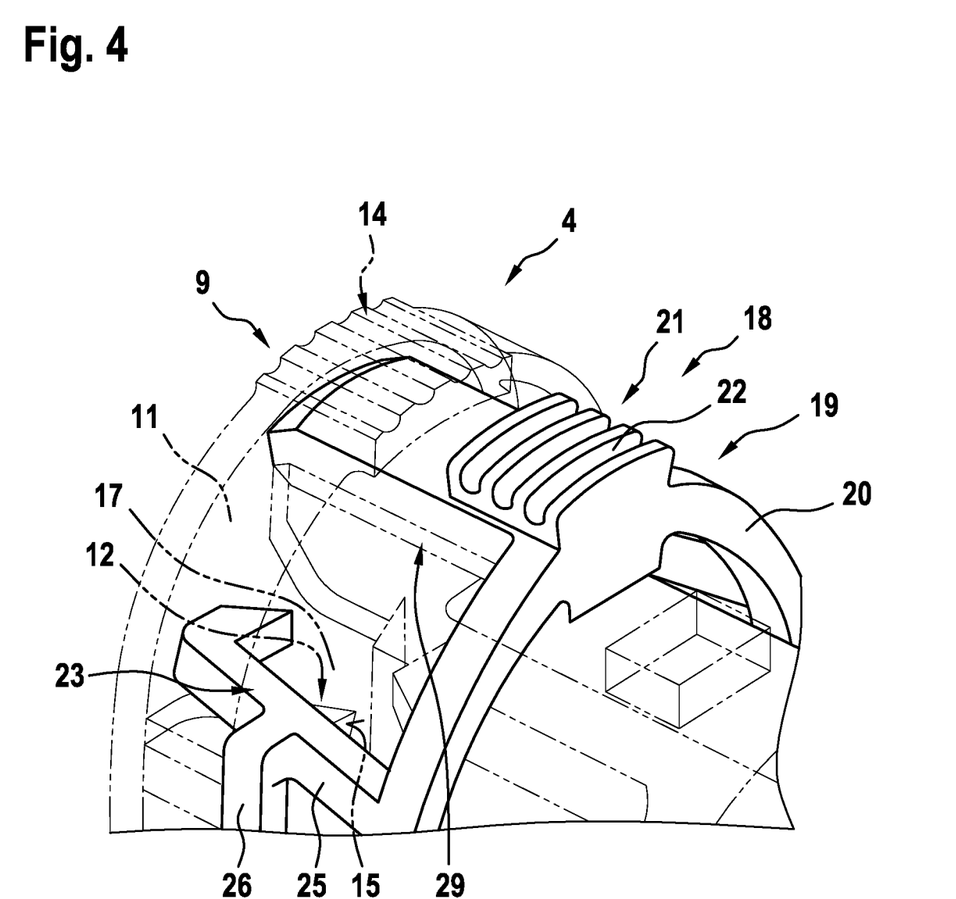
FIG. 4 shows a diagrammatic a representation of a detail of the coupling element.

FIG. 4 shows a diagrammatic representation of the coupling element 4, wherein the indicator device 18 is arranged in its second position. In this second position—as already explained—the transverse web 26 is in contact with the ring 11. At the same time, the guide projection 21, when viewed in the longitudinal section, is arranged between the ring 11 and the guide device 29. The guide device 29 is preferably of rigid design or at least it is stiffer than the ring 11. In the case of an elastic deformation of the ring 11, to that extent, said ring is supported on the guide device 29 of the latching device 9 in the radial direction inward via the indicator device 18 or its guide element 19. Correspondingly, a deformation of the ring 11 in the radial direction inward is prevented or at least limited.

Even when force is exerted on the ring 11 at the actuation sites 14 in the radial direction inward, to that extent, when the indicator device 18 is arranged in its second position, no deformation of the ring 11 can be brought about such that the latching connection between the latching projection 12 and the latching collar 6 and correspondingly between the coupling element 4 and the coupling counter-element 5 is undone. When the indicator device 18 is arranged in the second position, to that extent, the latching connection between coupling element 4 and coupling counter-element 5 is additionally secured against unintended disengagement.

Figure 5:
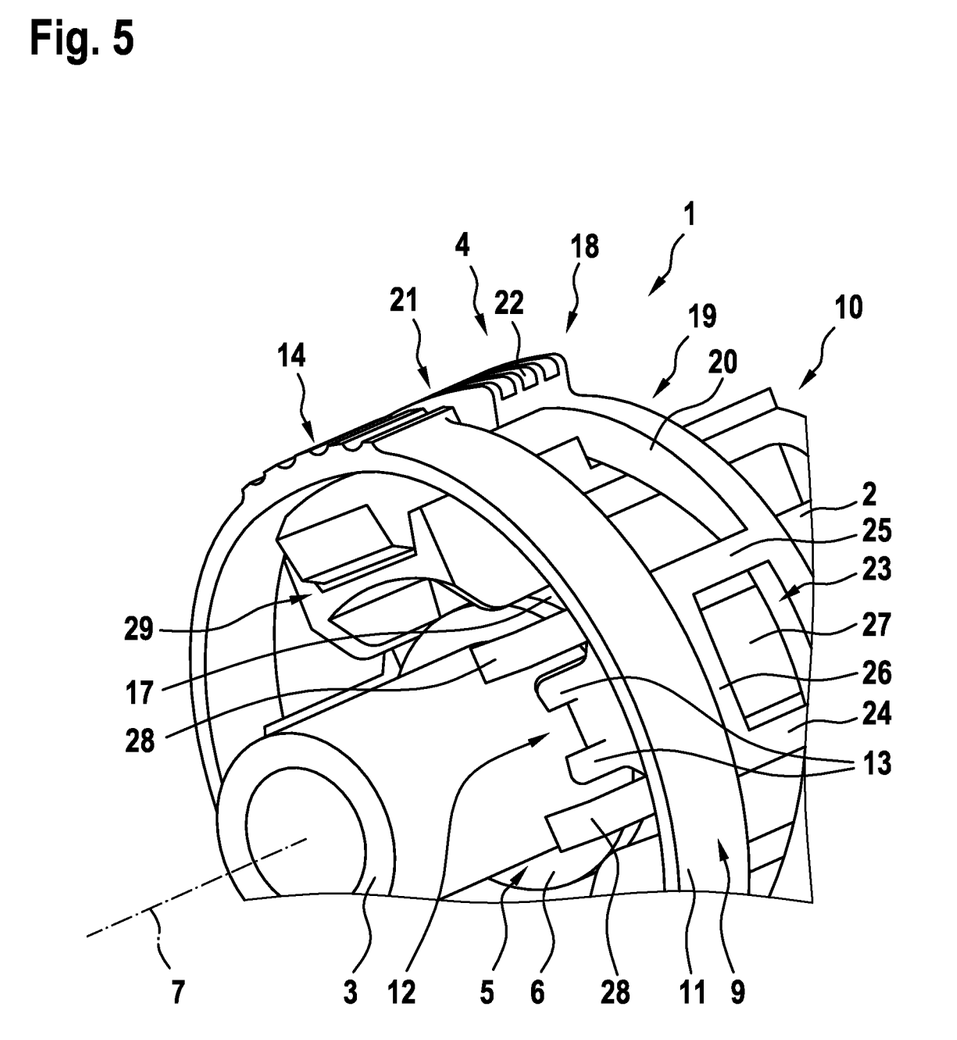
FIG. 5 shows an additional representation of a detail of the coupling element, wherein additionally the coupling counter-element can be seen.

FIG. 5 shows another diagrammatic representation of the coupling element 4, wherein, additionally, the coupling counter-element 5 is shown. The coupling counter-element 5 is arranged relative to the coupling element 4 in such a manner that the latching collar 6 is in the latch receiving area 17. In addition, the indicator device 18 has already been moved into its second position. In this second position, the retaining element 23 latches with the latching collar 6, so that said latching collar is retained in a latching manner not only by means of the latching device 9, that is to say the latching projection 12, but additionally by means of the retaining element 23. Due to the fact that the retaining element 23 pushes the latching collar 6 from behind, the indicator device 18 is secured in the second position, that is to say it cannot be moved directly out of said second position, in particular in the direction of the first position or into the first position. Correspondingly, a reliable securing of the indicator device 18 in the first position and correspondingly a reliable securing of the ring 11 against unintended actuation are ensured.

Overall, by means of the coupling element 4 or the coupling assembly 1, connections between fluid-conducting lines 2 and 3 can be implemented, which, on the one hand, are very reliable and long-lived and which, on the other hand, enable an easy mounting. Based on the position of the indicator device 18, a user of the coupling assembly 1 who is performing the mounting can easily read whether the latching connection between the coupling element 4 and the coupling counter-element 5 has been established definitively and reliably. This is even further reinforced by the latching of the retaining element 23 with the latching collar 6, during which a clearly perceivable latching sound is generated. In order to achieve a clear indicating effect of the indicator device 18, the indicator device 18 is at least partially and in particular completely of a different color than the latching device 9.

The invention claimed is:

1. A coupling element for connecting a first fluid-conducting line to a second fluid-conducting line, wherein the coupling element can be connected to the first line and is designed to receive a coupling counter-element which can be connected to the second line and which comprises an at least partially circumferential latching collar, wherein the coupling element has a latching device which comprises a main part and an elastically deformable ring, arranged on the main part, with at least one latching projection protruding inward in a radial direction relative to a longitudinal central axis of the coupling element, wherein, viewed in an axial direction relative to the longitudinal central axis, between an end abutment surface of the main part and a latching surface of the latching projection, a latch receiving area for receiving the latching collar lies, and wherein the ring and the latching projection are formed in such a manner that, when the coupling element and the coupling counter-element are connected, the latching projection is elastically deflected outward in the radial direction by the latching collar, and, after the arrangement of the latching collar in the latch receiving area, the latching projection assumes a latched position in which the latching projection pushes the latching collar from behind in a latching manner in order to retain the coupling counter-element relative to the coupling element, wherein an indicator device is mounted in the latching device and has a retaining element which can be elastically deflected in the radial direction relative to a guide element of the indicator device and which in a latched position engages in the latch receiving area and secures the indicator device in the axial direction by interacting with the main part and in a non-latched position lies outside of the latch receiving area and releases the indicator device to move in the axial direction, wherein the retaining element directly engages the latching collar when the retaining element is in the latched position.

2. The coupling element according to claim 1, wherein, in the latched position of the retaining element, a movement of the indicator device in the axial direction is limited, on one side, by the end abutment surface and, on another side, by an offset formed on the main part.

3. The coupling element according to claim 1, wherein the retaining element is formed in such a manner that, when the latching collar is introduced into the latch receiving area, the latching collar is pushed outward in the radial direction out of the latch receiving area and is moved into the non-latched position.

4. The coupling element according to claim 1, wherein, when the retaining element is arranged in the non-latched position, the indicator device is disengaged from an offset formed on the main part, so that a movement of the guide element in the direction of the ring is released.

5. The coupling element according to claim 1, wherein the retaining element has at least two retaining arms which are arranged, viewed in the circumferential direction, on both sides of the latching projection.

6. A coupling assembly for connecting a first fluid-conducting line to a second fluid-conducting line, with a coupling element according to claim 1.

7. The coupling element according to claim 1, wherein the latching collar is configured to push the retaining element outward in the radial direction and into the non-latched position when the latching collar is moved into the latch receiving area.

8. The coupling element according to claim 1, wherein the retaining element comprises a retaining projection with a sloping surface configured to interact with the latching collar to thereby push the retaining element from the latched position and into the non-latched position.

9. The coupling element according to claim 1, wherein the retaining element has at least two retaining arms each starting from the guide element and connected to one another by means of a transverse web spaced from the guide element.

10. The coupling element according to claim 9, wherein, in the latched position, the transverse web interacts with an offset in order to limit the movement of the indicator device in the axial direction.

11. The coupling element according to claim 1, wherein, when the retaining element is arranged in the non-latched position, the indicator device is released to move between a first position and a second position, wherein, in the first position, viewed in the axial direction, the retaining projection of the retaining element overlaps with the latch receiving area, and, in the second position, the indicator device interacts with the ring in order to prevent a movement beyond the second position.

12. The coupling element according to claim 1, wherein the main part has a guide device for linear guiding of the indicator device, wherein, viewed in the axial direction, the guide device overlaps with the ring, and the indicator device is in the second position between the main part and the ring, so that, in the case of an elastic deformation in the radial direction inward, the ring is supported via the indicator device on the main part for limiting the deformation.

13. The coupling element according to claim 1, wherein the retaining element latches onto the latching collar in the latched position.

* * * * *